(12) United States Patent
Culpi et al.

(10) Patent No.: US 8,593,033 B2
(45) Date of Patent: Nov. 26, 2013

(54) MULTI-ELEMENT, STICK-SLIP PIEZO MOTOR

(75) Inventors: William Culpi, Lake Forest, CA (US); Manfred Schneider, Costa Mesa, CA (US)

(73) Assignee: Micronix USA, Irvine, CA (US)

( * ) Notice: Subject to any disclaimer, the term of this patent is extended or adjusted under 35 U.S.C. 154(b) by 536 days.

(21) Appl. No.: 12/814,309

(22) Filed: Jun. 11, 2010

(65) Prior Publication Data
US 2010/0314970 A1     Dec. 16, 2010

Related U.S. Application Data

(60) Provisional application No. 61/268,322, filed on Jun. 11, 2009.

(51) Int. Cl.
*H01L 41/08*     (2006.01)

(52) U.S. Cl.
USPC ............................ 310/323.02; 310/328

(58) Field of Classification Search
USPC ........ 310/329, 323, 318, 317, 316, 328, 339, 310/319, 323.02, 311, 323.03, 312, 331, 310/316.02, 332, 333
IPC ....................................................... H01L 41/08
See application file for complete search history.

(56) References Cited

U.S. PATENT DOCUMENTS

| | | | |
|---|---|---|---|
| 5,043,621 A * | 8/1991 | Culp | 310/328 |
| 6,940,210 B2 * | 9/2005 | Karrai et al. | 310/328 |
| 7,196,454 B2 * | 3/2007 | Baur et al. | 310/323.01 |
| 7,355,325 B2 * | 4/2008 | Johansson et al. | 310/328 |
| 2013/0015745 A1 * | 1/2013 | Hwu et al. | 310/323.02 |

* cited by examiner

*Primary Examiner* — Thomas Dougherty
*Assistant Examiner* — Karen B Addison
(74) *Attorney, Agent, or Firm* — John R Ross; John R Ross, III

(57) ABSTRACT

A stick-slip piezo motor. A piezo housing holds at least two piezo elements. The piezo elements are both rigidly connected to the piezo housing. At the end of each of the piezo elements is a piezo friction element. Each of the piezo friction elements is in friction contact with a moving friction element. While oscillating between a stick phase and a slip phase, both of the friction elements operate in conjunction to move the moving friction element in a desired travel direction. The piezo elements oscillate out of phase such that when one of the oscillating piezo elements is operating in the slip phase and moving in a direction opposite to the desired travel direction, the other oscillation piezo element is operating in the stick phase and is moving in the travel direction in order to counteract and overcome unwanted dragging of the moving piezo element.

13 Claims, 13 Drawing Sheets

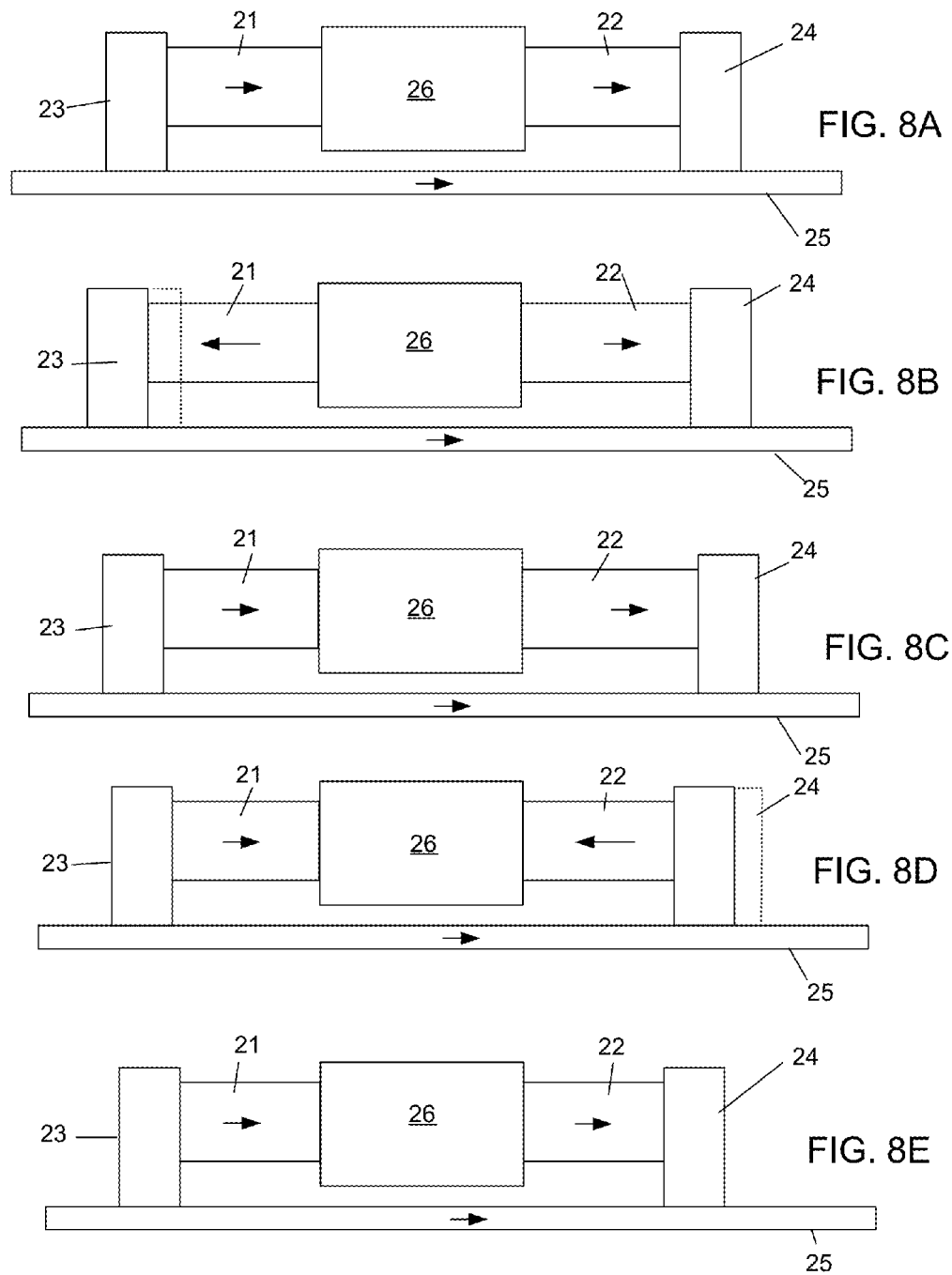

MULTI-ELEMENT, STICK-SLIP PIEZO MOTOR

This application claims the benefit of Provisional Application No. 61/268,322, filed Jun. 11, 2009. The present invention relates to piezo motors, and in particular, to piezo motors that utilize a stick-slip mode of operation.

BACKGROUND OF THE INVENTION

Piezo motors are known. Typically, piezo motors are comprised of motors with many mm of available linear travel or any degree of rotational travel. Generally, a piezo element actuates a friction element that in turn moves a second friction element (sliding element). These piezo motors can be roughly separated into resonant and non-resonant types. Resonant type piezo motors exhibit high-speed, but are less stable at very high resolutions (nanometer to sub-nanometer range). Resonant piezo motors operate in the resonant frequency range of the piezo. Non-resonant piezo motors operate below the resonant frequency range of the piezo (and are often audible). Some of the non-resonant type piezo motors are based on the inertial or stick-slip principle and sometimes are able to achieve nano-meter resolutions.

The main problem with conventional piezo motors based on the non-resonant, stick-slip principle is that the moving part of the actuator retracts slightly during the "slip" part of the actuation cycle which results in poor constant velocity behavior, lost efficiency and a decrease of the position control of the actuator. This behavior is especially pronounced at slow velocities. Another problem with the conventional piezo motor is that the available actuation force is limited to the achievable friction of the friction element attached to the piezo element, which needs to be limited to not cause significant retraction during the slip phase of the actuator.

For example, FIG. 1A shows prior art stick-slip piezo motor 140. AC voltage source 142 provides alternating current to piezo element 141. Piezo element 141 is rigidly connected to piezo base 146. Friction element 143 is rigidly attached to piezo element 141. Friction element 143 is pressed against sliding friction element 145. During the stick phase of the cycle, piezo element 141 expands relatively slowly to the right so that friction force is not overcome and there is no slipping. During the slip phase of the cycle, piezo element 141 contracts to the left at a much faster rate to overcome the friction between friction element 143 and sliding friction element 145. The inertia of sliding friction element 145 is not overcome and there is slipping between friction element 143 and sliding friction element 145. Slipping is desired so that friction element 143 does not drag sliding friction element 145 backwards to the left. Stated differently, sliding friction element 145 presses against friction element 143 with sufficient force so that friction element 143 moves sliding friction element 145 during the stick phase of the oscillation yet also with such force so that friction element 143 does not significantly drag sliding friction element 145 backwards during the slip phase of the oscillation.

With prior art stick-slip piezo motors, there has been a problem with eliminating unwanted dragging during the slip phase. FIG. 1B shows a graphical representation of the resultant motion of a prior art stick-slip piezo motor as a function of time. As is clearly shown there is significant undesired retraction 153 during the slip phase of the cycle.

What is needed is a better stick-slip piezo motor.

SUMMARY OF THE INVENTION

The present invention provides a multi-phase, stick-slip piezo motor. A piezo housing holds at least two piezo elements. The piezo elements are both rigidly connected to the piezo housing. At the end of each of the piezo elements is a piezo friction element. Each of the piezo friction elements is in friction contact with a moving friction element. While oscillating between a stick phase and a slip phase, both of the friction elements operate in conjunction to move the moving friction element in a desired travel direction. The piezo elements oscillate out of phase such that when one of the oscillating piezo elements is operating in the slip phase and moving in a direction opposite to the desired travel direction, the other piezo element is operating in the stick phase and is moving in the travel direction in order to counteract and overcome unwanted dragging of the moving friction element. In one preferred embodiment, the travel direction is linear. In another preferred embodiment the travel direction is rotational. In another preferred embodiment, more than two piezo elements are utilized to operate in conjunction to move the sliding friction element in a desired travel direction.

BRIEF DESCRIPTION OF THE DRAWINGS

FIGS. 8A-8E depict the resultant motion of the sliding friction element of the piezo motor of FIG. 6.

DETAILED DESCRIPTION OF THE PREFERRED EMBODIMENTS

Figure 1A:
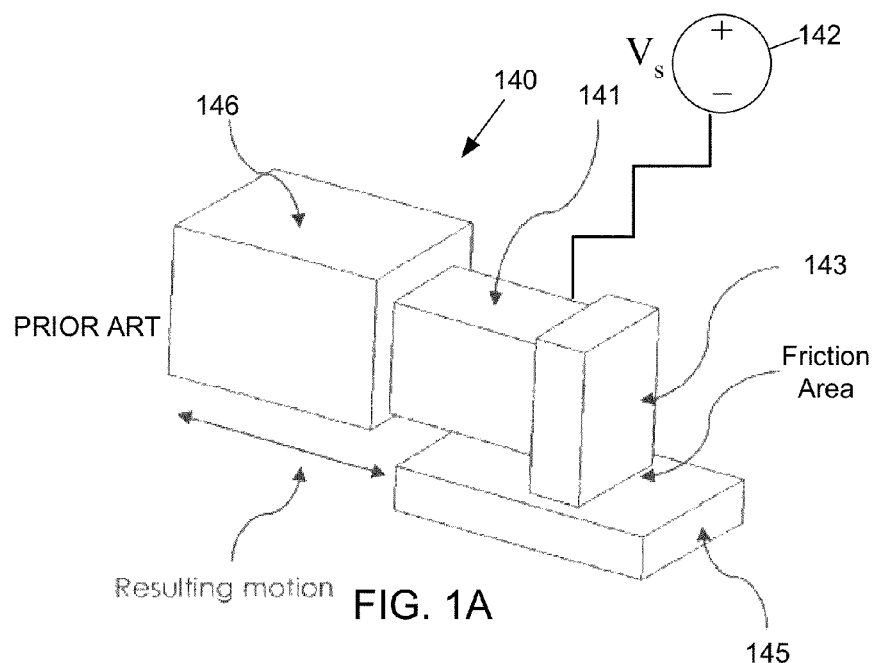
FIG. 1A shows a prior art stick-slip piezo motor.
Figure 2:
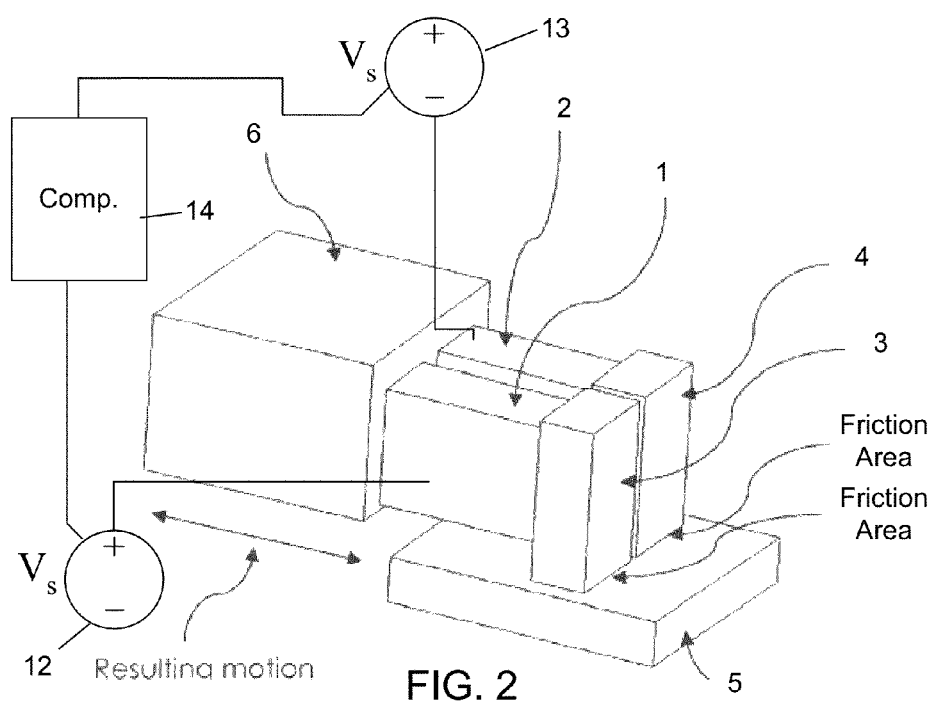
FIG. 2 shows a preferred embodiment of the present invention.
Figure 1B:
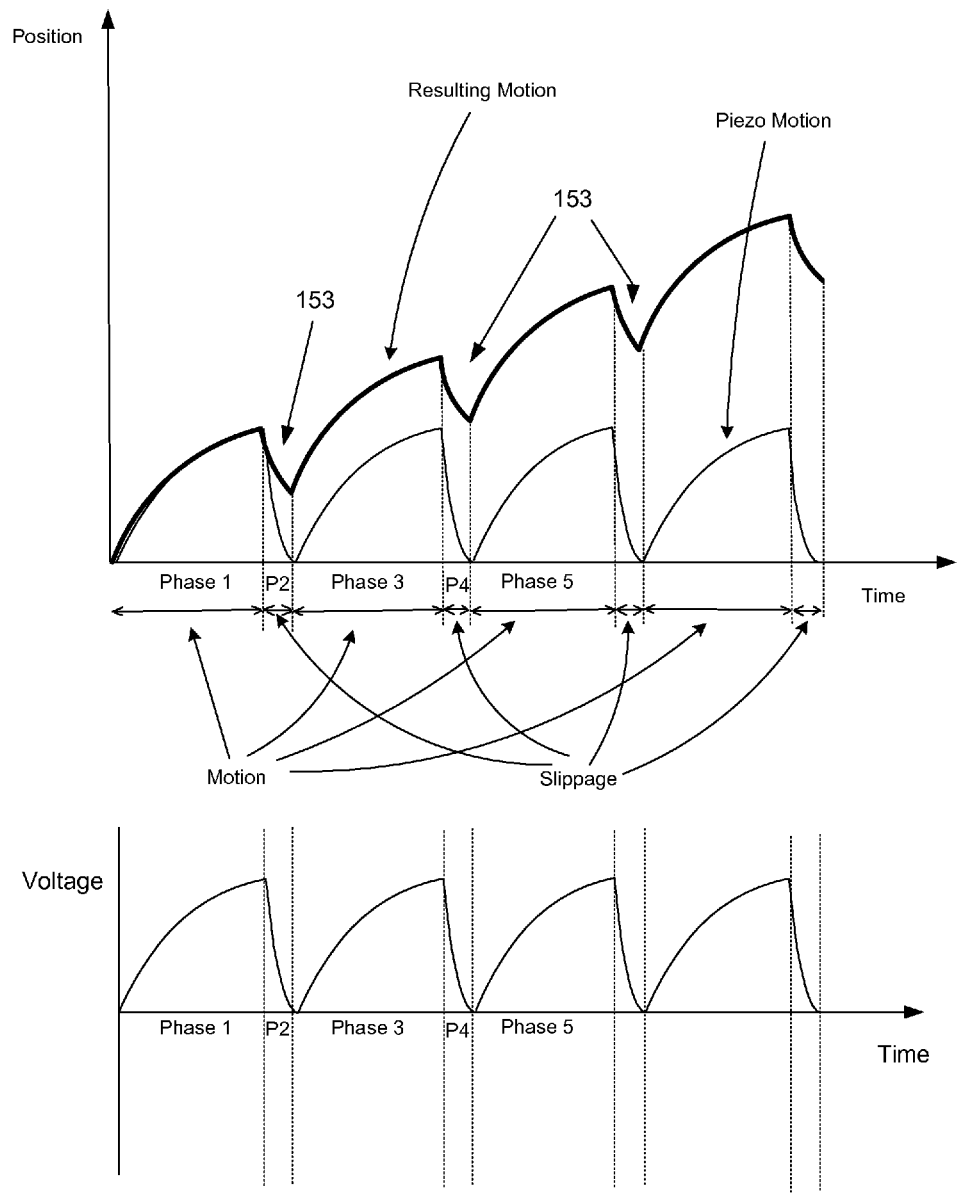
FIG. 1B shows a graph depicting the resultant motion caused by a prior art stick-slip piezo motor.

FIG. 2 shows a simplified drawing of a preferred piezo motor 10. Piezo elements 1 and 2 are both rigidly connected to holding element 6. Friction elements 3 and 4 are both connected to piezo elements 1 and 2, respectively. Friction element 5 is pressed against friction elements 3 and 4. Sliding friction element 5 is the object being moved by piezo motor 10. Voltage source 12 is connected to piezo element 1. Voltage source 13 is connected to piezo element 2. Computer 14 is connected to voltage sources 12 and 13 and is programmed to control the output of voltage sources 12 and 13.

Piezo Element

Piezo elements 1 and 2 are multi-layer piezo elements that exhibit longitudinal expansion when a voltage is applied. A preferred piezo element is a 3×3×3 mm stack with a 1 micrometer expansion at 150V applied voltage.

Holding Element

As stated above piezo elements 1 and 2 are rigidly attached to holding element 6. Holding element 6 may be fixed or moving depending on the arrangement of the motor.

Oscillating Friction Elements

Friction elements 3 and 4 are fabricated from any material that causes friction when applied to sliding friction element 5. In a preferred embodiment, friction elements 3 and 4 are ceramic friction elements. When voltage is applied to piezo elements 1 and 2, the resultant oscillation of piezo elements 1 and 2 will cause friction element 5 to move in a predetermined manner.

Sliding Friction Element

Sliding friction element 5 is the object being moved by friction elements 3 and 4. Sliding friction element 5 is pressed against friction elements 3 and 4 with sufficient force so that friction elements 3 and 4 move friction element 5 during the stick phase of the oscillation yet also with such force so that friction elements 3 and 4 do not significantly drag friction element 5 backwards during the slip phase of the oscillation.

FIG. 3 shows a graphical representation illustrating the operation of the preferred embodiment of the present invention shown above in FIG. 2.

Figure 3A:
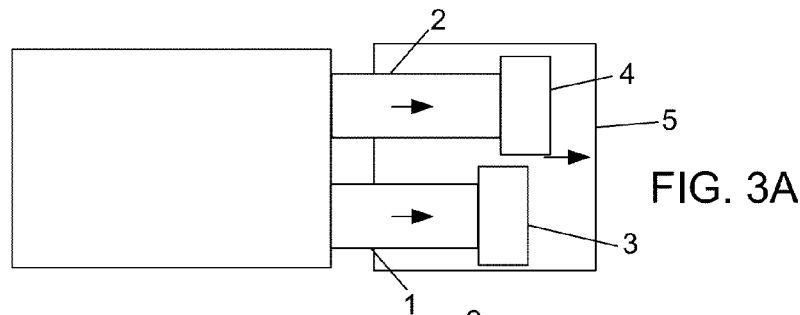
FIGS. 3A-3E depict the resultant motion of the sliding friction element of the piezo motor of FIG. 2.
Figure 4:
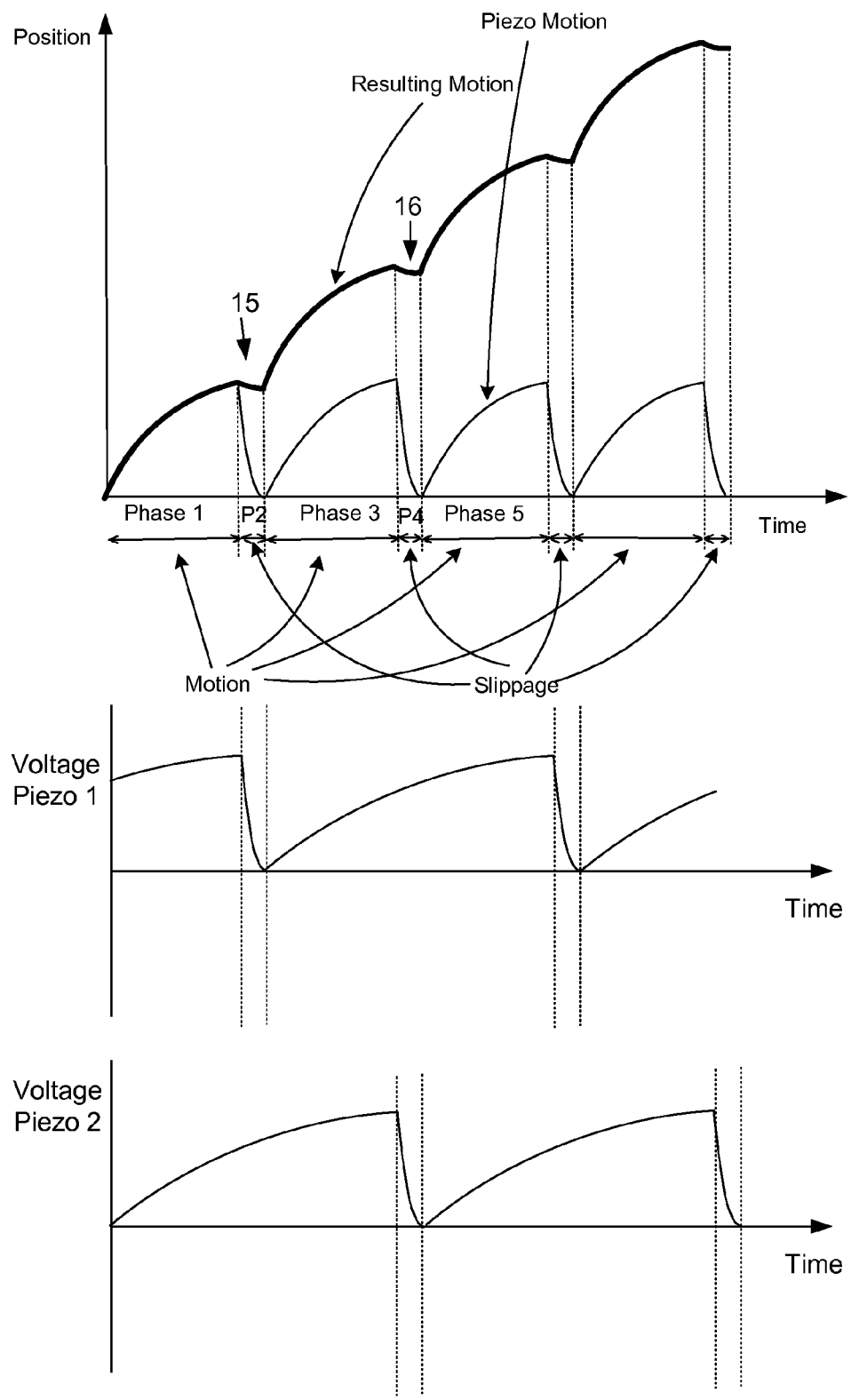
FIG. 4 shows a graphical representation describing the resultant motion of the sliding friction element of the piezo motor of FIG. 2.

Cycle phase 1: Voltage sources 12 and 13 are applying voltage to elements 1 and 2 so that elements 1 and 2 are both expanding in the same direction (FIG. 3A). The applied voltage increases at a low enough rate so that the speed of the expansion is slow enough so that the friction force between friction elements 3 and 4 and sliding friction element 5 is not overcome. Therefore, there is no slipping between friction elements 3 and 4 and sliding friction element 5. Hence, both piezo element 1 and piezo element 2 are in the stick phase of motion causing sliding friction element 5 to move in a linear motion consistent with the linear motion of piezo elements 1 and 2 (FIG. 4).

Figure 3B:
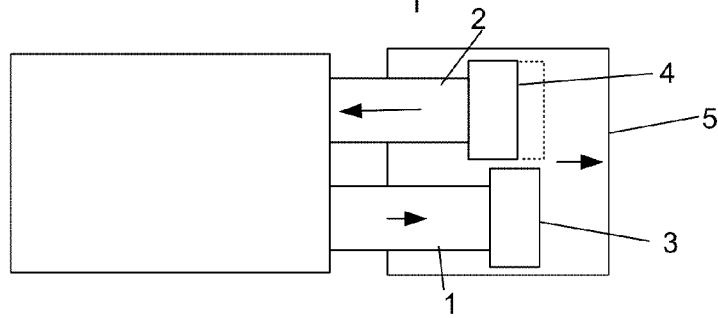

Cycle Phase 2: Voltage source 12 is continuing to apply voltage with a slope slow enough to piezo element 1 so that it continues to expand in the same direction. However, the voltage from voltage source 13 drops to zero at a rapid rate causing piezo element 2 to contract at a rapid rate (FIG. 3B). Piezo element 2 contracts at such a rapid rate that the friction force between friction element 4 and sliding friction element 5 is significantly overcome. Hence, during cycle phase 2 piezo element 1 is still in the stick phase but piezo element 2 is now in the slip phase. The inertia of sliding friction element 5 and the forward motion of piezo element 1 counteracts and overcomes most of the reverse motion imparted by piezo element 2. Hence during Cycle Phase 2, there is only a very slight dip 15 to the resultant motion curve (FIG. 4).

Figure 3C:
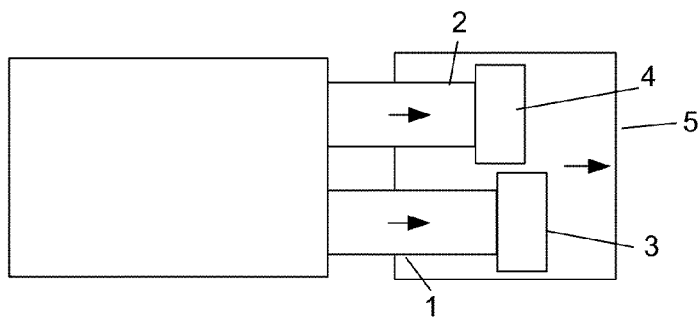

Cycle Phase 3: Voltage sources 12 and 13 are applying voltage to elements 1 and 2 so that elements 1 and 2 are both expanding in the same direction (FIG. 3C). The applied voltage increases at a low enough rate so that the speed of the expansion is slow enough so that the friction force between friction elements 3 and 4 and sliding friction element 5 is not overcome. Therefore, there is no slipping between friction elements 3 and 4 and sliding friction element 5. Hence, both piezo element 1 and piezo element 2 are in the stick phase of motion causing sliding friction element 5 to move in a linear motion consistent with the linear motion of piezo elements 1 and 2.

Figure 3D:
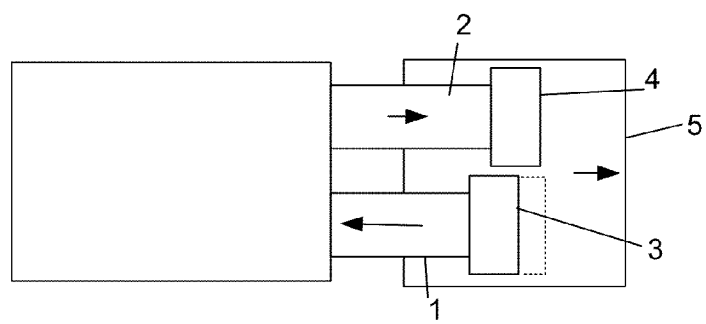
Figure 3E:
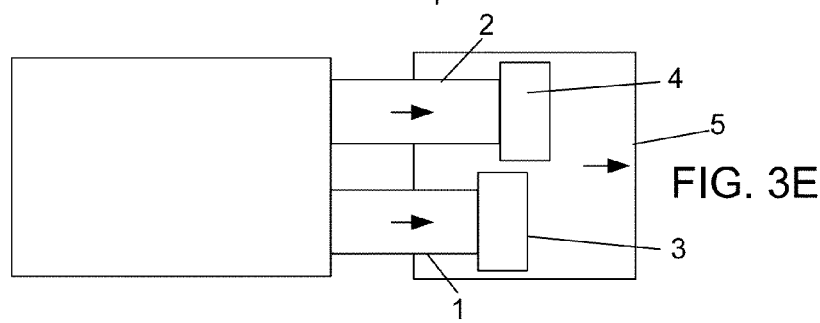

Cycle Phase 4: Voltage source 13 is continuing to apply voltage with a slope slow enough to piezo element 2 so that it continues to expand in the same direction. However, the voltage from voltage source 12 drops to zero at a rapid rate causing piezo element 1 to contract at a rapid rate (FIG. 3D). Piezo element 1 contracts at such a rapid rate that the friction force between friction element 3 and sliding friction element 5 is significantly overcome, but not entirely. Hence, during cycle phase 2 piezo element 2 is still in the stick phase but piezo element 1 is now in the slip phase. The inertia of sliding friction element 5 forward motion of piezo element 2 counteracts and overcomes most of the reverse motion imparted by piezo element 1. Hence during Cycle Phase 4, there is only a very slight dip 16 to the resultant motion curve (FIG. 4).

Cycle Phase 5: The motion in cycle phase 5 is similar to that described above in reference to cycle phase 1. Accordingly the cycles continue to repeat until the command signals are altered.

Command Signal Linearized

Figure 5:
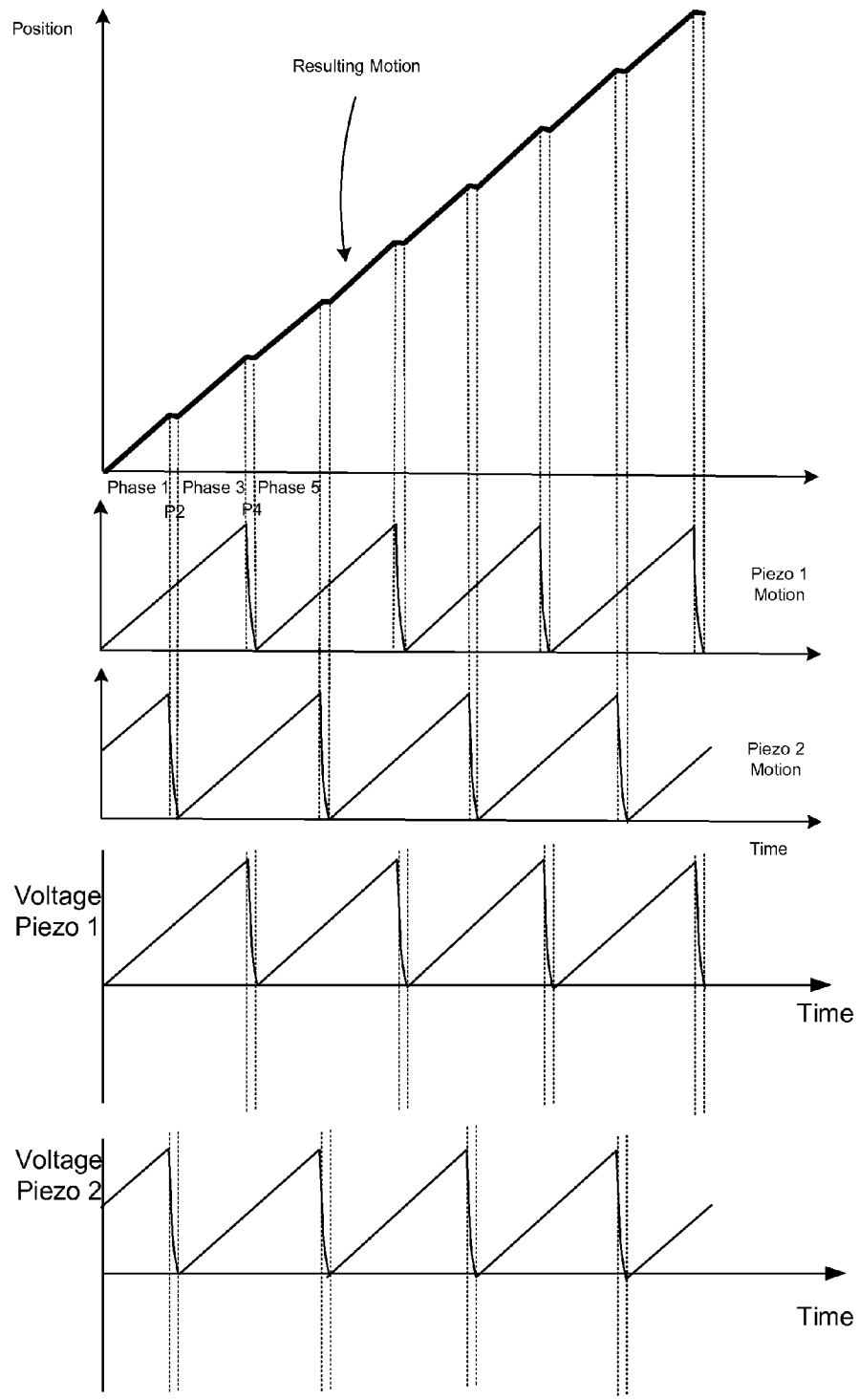
FIG. 5 shows a linearized graphical representation of the resultant motion of the sliding friction element of the piezo motor of FIG. 2.

FIG. 5 shows a graphical representation similar to that depicted in FIG. 3. However, in FIG. 5 the command signals from computer 14 (FIG. 2) have been linearized. Linearization of the command signals is preferred because the resultant motion is more linear with less slippage.

OTHER PREFERRED EMBODIMENTS

Multi-Element Stick-Slip Piezo Motor, Opposite Phase Version, Linear Motion

Figure 6:
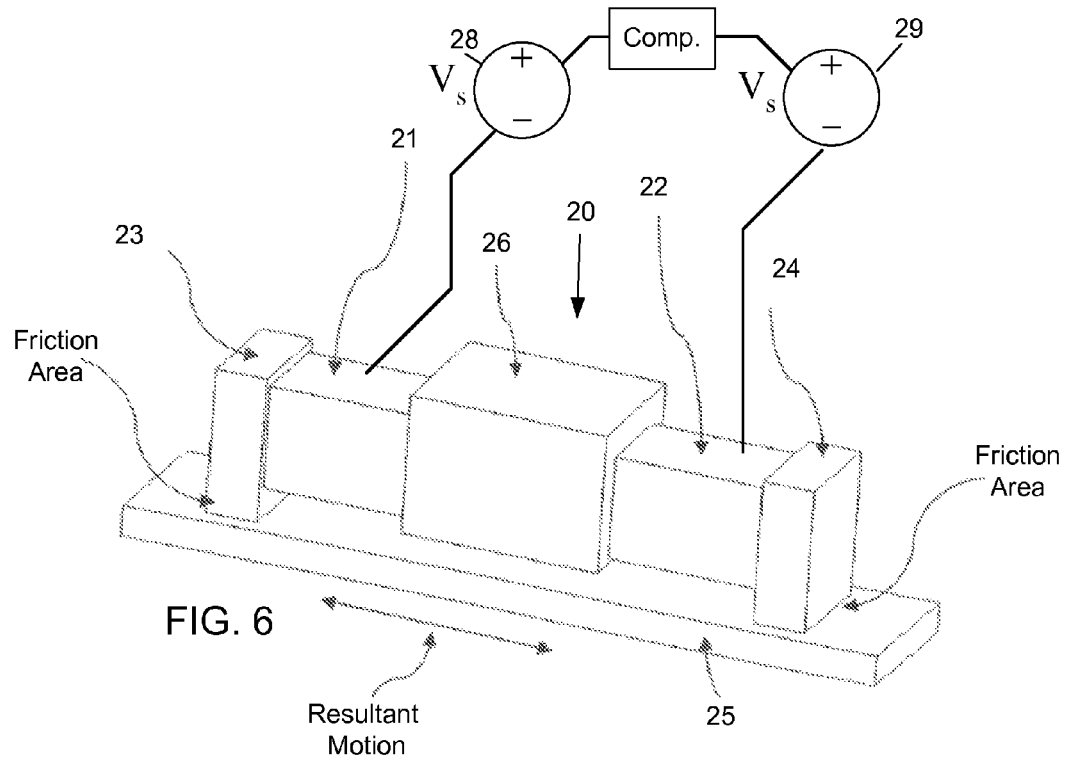
FIG. 6 shows another preferred embodiment of the present invention.

FIG. 6 shows another preferred embodiment of the present invention.

Piezo elements 21 and 22 are both rigidly connected to holding element 26. Friction elements 23 and 24 are both connected to piezo elements 21 and 22, respectively. Friction element 25 is pressed against friction elements 23 and 24. Sliding friction element 25 is the object being moved by piezo motor 20. Voltage source 28 is connected to piezo element 21. Voltage source 29 is connected to piezo element 22. Computer 27 is connected to voltage sources 28 and 29 and is programmed to control the output of voltage sources 28 and 29.

Cycle phase 1: Voltage sources 28 and 29 are applying voltage out of phase with respect to elements 21 and 22 so that element 21 is contracting to the right and element 22 is expanding to the right (FIG. 8A). The rate of change of the applied voltage is low enough so that the speed of the piezo elements 21 and 22 is slow enough so that the friction force between friction elements 23 and 24 and sliding friction element 25 is not overcome. Therefore, there is no slipping between friction elements 23 and 24 and sliding friction element 25. Hence, both friction element 21 and piezo element 22 are in the stick phase of motion causing sliding friction element 25 to move in a linear motion consistent with the linear motion of piezo elements 21 and 22.

Cycle Phase 2: Voltage source 29 is continuing to apply voltage with a slope slow enough to piezo element 22 so that it continues to expand to the right. However, the voltage from voltage source 28 has reversed at a rapid rate causing piezo element 21 to expand to the left at a rapid rate (FIG. 8B). Piezo element 21 expands at such a rapid rate that the inertia of sliding friction element 25 overcomes the friction force between friction element 23 and sliding friction element 25. Hence, during cycle phase 2 piezo element 22 is still in the stick phase but piezo element 21 is now in the slip phase. The forward motion of piezo element 22 counteracts and overcomes most of the reverse motion imparted by piezo element 21. Hence during Cycle Phase 2, there is only a very slight dip to the resultant linear motion curve.

Cycle Phase 3: Voltage sources 28 and 29 are applying voltage out of phase with respect to elements 21 and 22 so that element 21 is contracting to the right and element 22 is expanding to the right (FIG. 8C). The rate of change of the applied voltage is low enough so that the speed of the piezo elements 21 and 22 is slow enough so that the friction force between friction elements 23 and 24 and sliding friction element 25 is not overcome. Therefore, there is no slipping between friction elements 23 and 24 and sliding friction element 25. Hence, both piezo element 21 and piezo element 22 are in the stick phase of motion causing sliding friction element 25 to move in a linear motion consistent with the linear motion of piezo elements 21 and 22.

Cycle Phase 4: Voltage source 28 is continuing to apply voltage with a slope slow enough to piezo element 21 so that it continues to contract to the right. However, the voltage from voltage source 29 has reversed at a rapid rate causing piezo element 22 to contract at a rapid rate (FIG. 8D). Piezo element 22 contracts at such a rapid rate that the inertia of sliding friction element 25 overcomes the friction force between friction element 24 and sliding friction element 25. Hence, during cycle phase 4 piezo element 21 is still in the stick phase but piezo element 22 is now in the slip phase. The right moving motion of piezo element 21 counteracts and overcomes most of the reverse motion imparted by piezo element 22. Hence during Cycle Phase 4, there is only a very slight dip to the resultant motion curve.

Cycle Phase 5: The motion in cycle phase 5 is similar to that described above in reference to cycle phase 1. Accordingly the cycles continue to repeat until the command signals are altered.

Multi-Element Stick-Slip Piezo Motor, Opposite Phase Version, Rotational Motion

Figure 7:
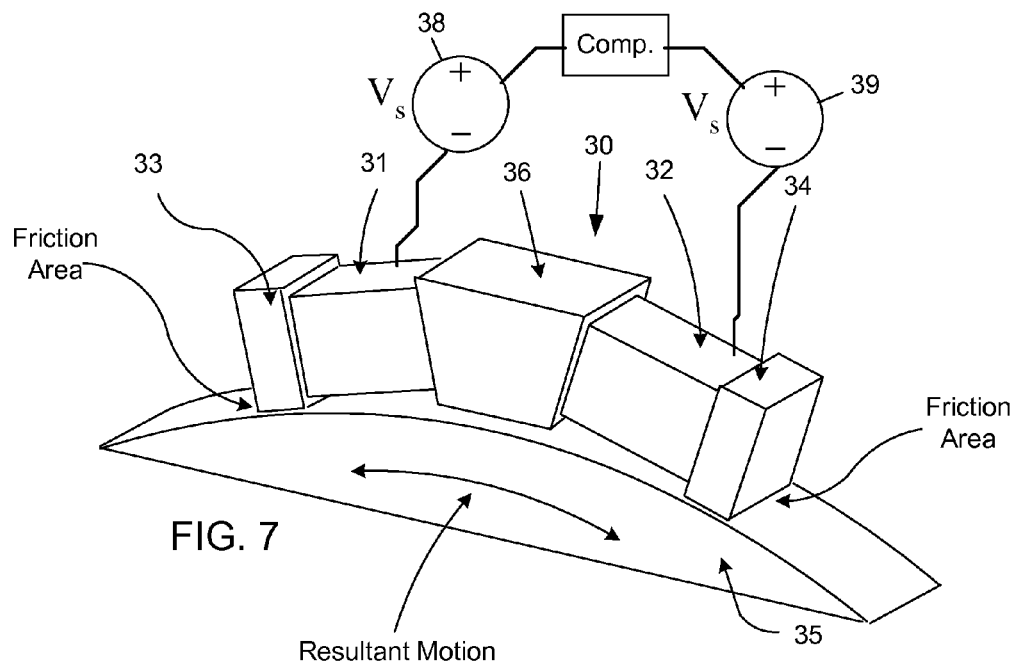
FIG. 7 shows another preferred embodiment of the present invention.

FIG. 7 shows another preferred embodiment of the present invention.

Piezo elements 31 and 32 are both rigidly connected to holding element 36. Friction elements 33 and 34 are both connected to piezo elements 31 and 32, respectively. Rotational friction element 35 is pressed against friction elements 33 and 34. Rotational friction element 35 is the object being moved by piezo motor 30. Voltage source 38 is connected to piezo element 31. Voltage source 39 is connected to piezo element 32. Computer 37 is connected to voltage sources 38 and 39 and is programmed to control the output of voltage sources 38 and 39.

Figure 9A:
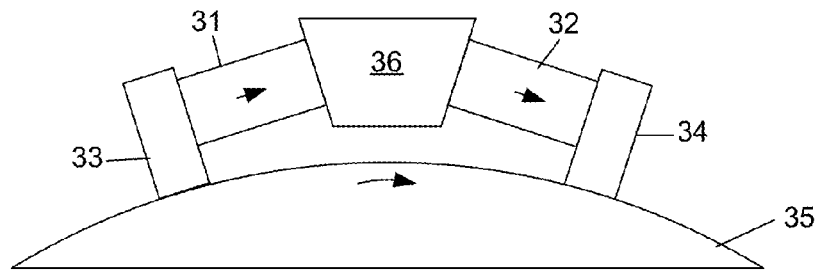
FIGS. 9A-9E depict the resultant motion of the sliding friction element of the piezo motor of FIG. 7.

Cycle phase 1: Voltage sources 38 and 39 are applying voltage out of phase with respect to elements 31 and 32 so that element 31 is contracting to the right and element 22 is expanding to the right (FIG. 9A). The rate of change of the applied voltage is low enough so that the speed of the piezo elements 31 and 32 is slow enough so that the friction force between friction elements 33 and 34 and rotational friction element 35 is not overcome. Therefore, there is no slipping between friction elements 23 and 24 and rotational friction element 35. Hence, both piezo element 31 and piezo element 32 are in the stick phase of motion causing rotational friction element 35 to move in a rotational motion consistent with the motion of piezo elements 31 and 32.

Figure 9B:
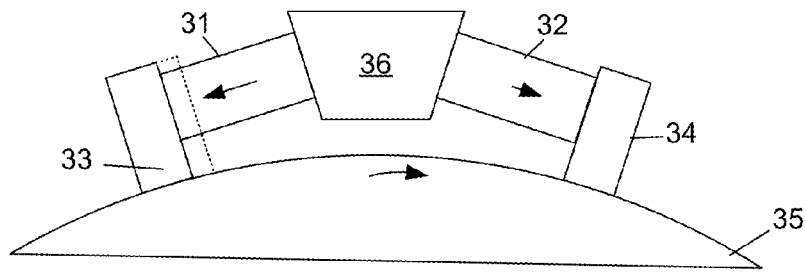

Cycle Phase 2: Voltage source 39 is continuing to apply voltage with a slope slow enough to piezo element 32 so that it continues to expand to the right. However, the voltage from voltage source 38 has reversed at a rapid rate causing piezo element 31 to expand to the left at a rapid rate (FIG. 9B). Piezo element 31 expands at such a rapid rate that the inertia of rotational friction element 35 overcomes the friction force between friction element 33 and rotational friction element 35. Hence, during cycle phase 2 piezo element 32 is still in the stick phase but piezo element 31 is now in the slip phase. The rightward motion of piezo element 32 counteracts and overcomes most of the reverse motion imparted by piezo element 31. Hence during Cycle Phase 2, there is only a very slight dip to the resultant linear motion curve.

Figure 9C:
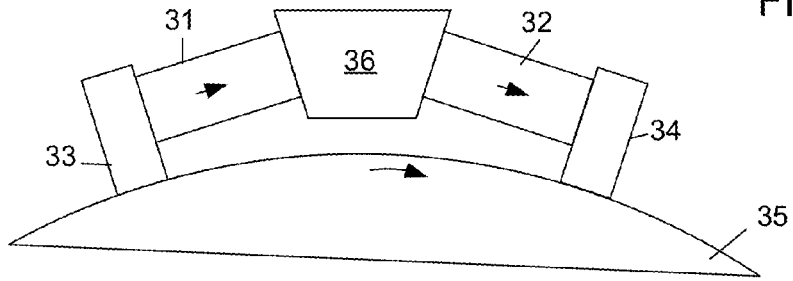

Cycle Phase 3: Voltage sources 38 and 39 are applying voltage out of phase with respect to elements 31 and 32 so that element 31 is contracting to the right and element 32 is expanding to the right (FIG. 9C). The rate of change of the applied voltage is low enough so that the speed of the piezo elements 31 and 32 is slow enough so that the friction force between friction elements 33 and 34 and rotational friction element 35 is not overcome. Therefore, there is no slipping between friction elements 33 and 34 and rotational friction element 35. Hence, both piezo element 31 and piezo element 32 are in the stick phase of motion causing rotational friction element 35 to move in a linear motion consistent with the linear motion of piezo elements 31 and 32.

Figure 9D:
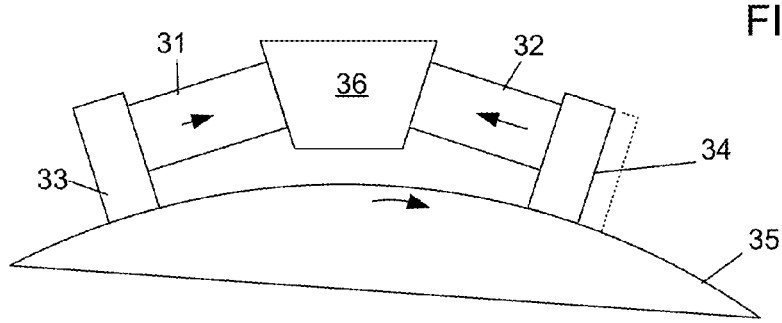
Figure 9E:
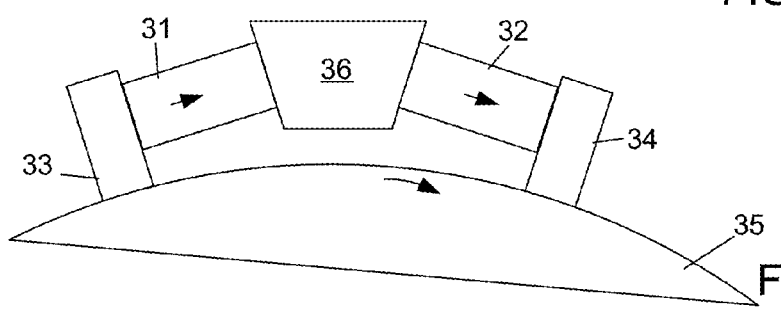

Cycle Phase 4: Voltage source 38 is continuing to apply voltage with a slope slow enough to piezo element 31 so that it continues to contract to the right. However, the voltage from voltage source 39 has reversed at a rapid rate causing piezo element 32 to contract at a rapid rate (FIG. 9D). Piezo element 32 contracts at such a rapid rate that the inertia of rotational friction element 35 overcomes the friction force between friction element 34 and rotational friction element 35. Hence, during cycle phase 4 piezo element 31 is still in the stick phase but piezo element 32 is now in the slip phase. The right moving motion of piezo element 31 counteracts and overcomes most of the reverse motion imparted by piezo element 32. Hence during Cycle Phase 4, there is only a very slight dip to the resultant motion curve.

Cycle Phase 5: The motion in cycle phase 5 is similar to that described above in reference to cycle phase 1. Accordingly the cycles continue to repeat until the command signals are altered.

Linear Motion

Figure 10:
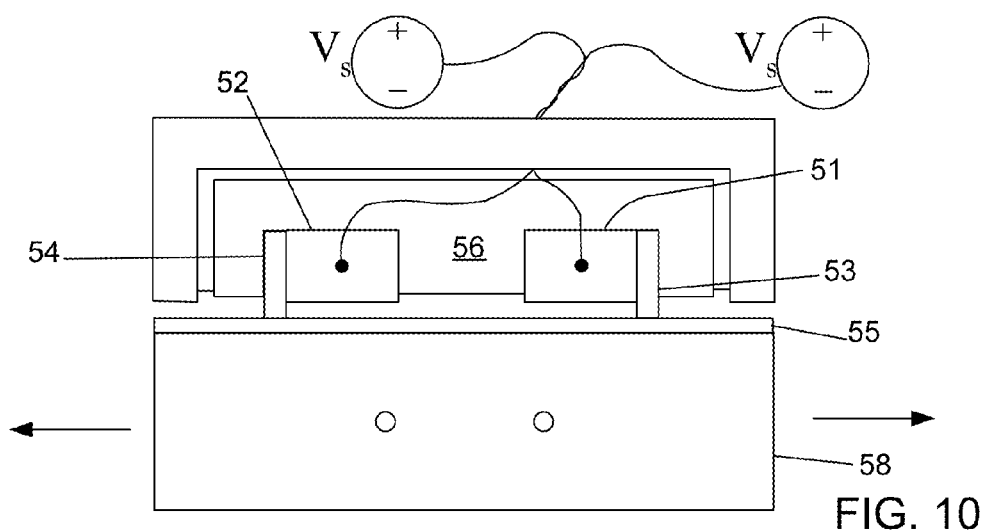
FIG. 10 shows another preferred embodiment of the present invention.

FIG. 10 shows another preferred embodiment that provides for linear motion. Piezo motor 50 is also similar to the embodiment shown in FIG. 6. Piezo element 51 and piezo element 52 are housed in piezo housing 56. Ceramic friction elements 53 and 54 are rigidly connected to piezo elements 51 and 52, respectively. Voltage is applied to piezo elements 51 and 52 so that ceramic friction elements 53 and 54 operate to move friction plate 55 in the direction shown by the arrows in FIG. 10. Ceramic friction plate 55 is rigidly connected to plate 58. A user of motor 40 may attach devices to plate 58, as preferred.

Rotary Motion

Figure 11:
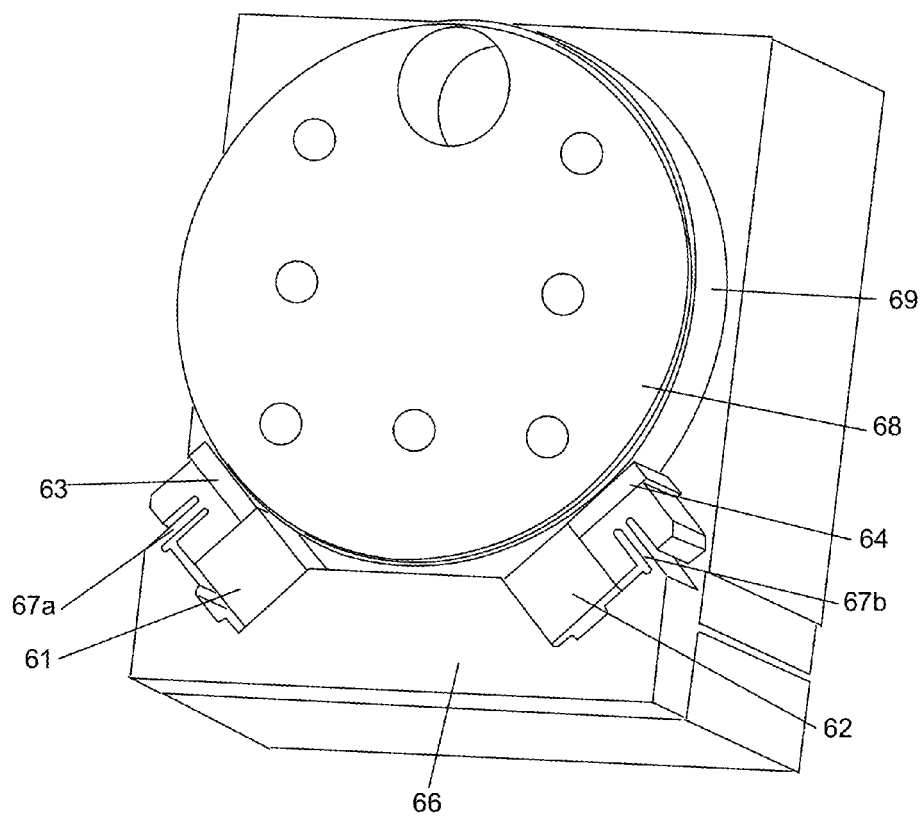
FIG. 11 shows another preferred embodiment of the present invention.

FIG. 11 shows a preferred embodiment that provides for rotational motion. Piezo motor 60 is similar to the embodiment shown in FIG. 7. Piezo element 61 and piezo element 62 are housed in piezo housing 66. Ceramic friction elements 63 and 64 are rigidly connected to piezo elements 61 and 62, respectively. Voltage is applied to piezo elements 61 and 62 so that ceramic friction elements 63 and 64 operate to rotate disc 68 clockwise or counterclockwise, as preferred. Surrounding disc 68 is rigidly connected ceramic friction band 69. A user of motor 60 may attach devices to 68, as preferred. Pressure is applied to ceramic friction elements 63 and 64 by springs 67a and 67b, respectively. The degree of pressure force applied is such that elements 63 and 64 move band 69 during the stick phase of the oscillation yet also with such force so that friction elements 63 and 64 do not significantly drag friction band 69 in the undesired direction during the slip phase of the oscillation.

Figure 12:
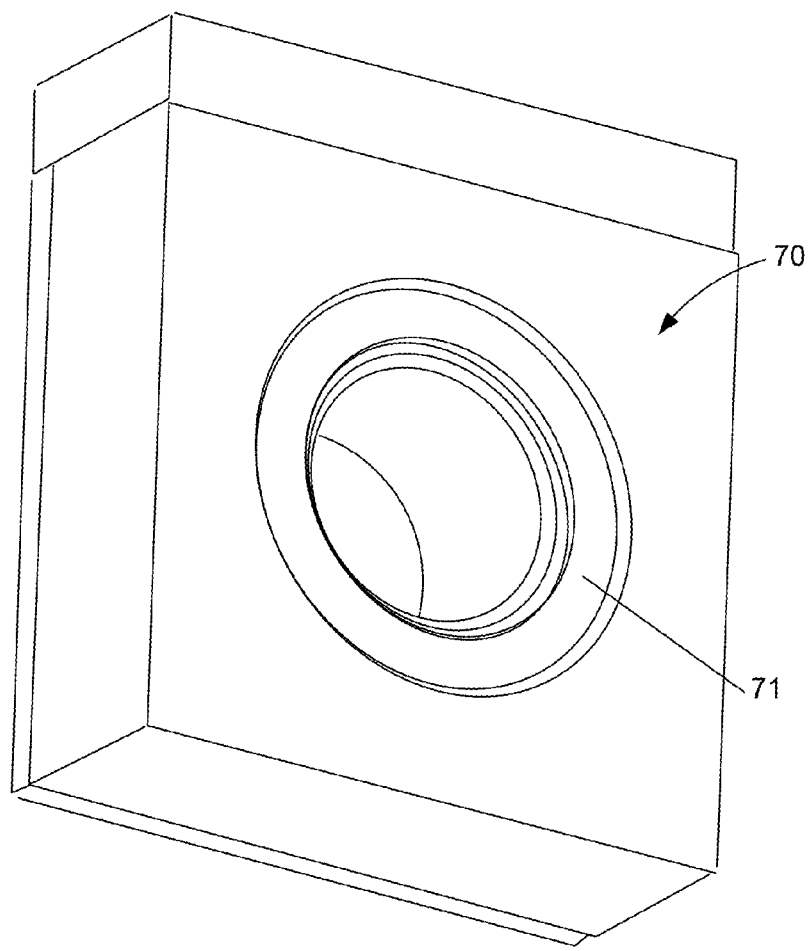
FIG. 12 shows another preferred embodiment of the present invention.

FIG. 12 shows another preferred embodiment that provides for rotational motion. The piezo arrangement for motor 70 is similar to that shown for motor 60. However, instead of rotating a circular disc, two piezo elements act in conjunction to turn rotor 71. An operator may rigidly attach an axis to rotor 71 to spin the axis as desired.

Planar Motion

Figure 13:
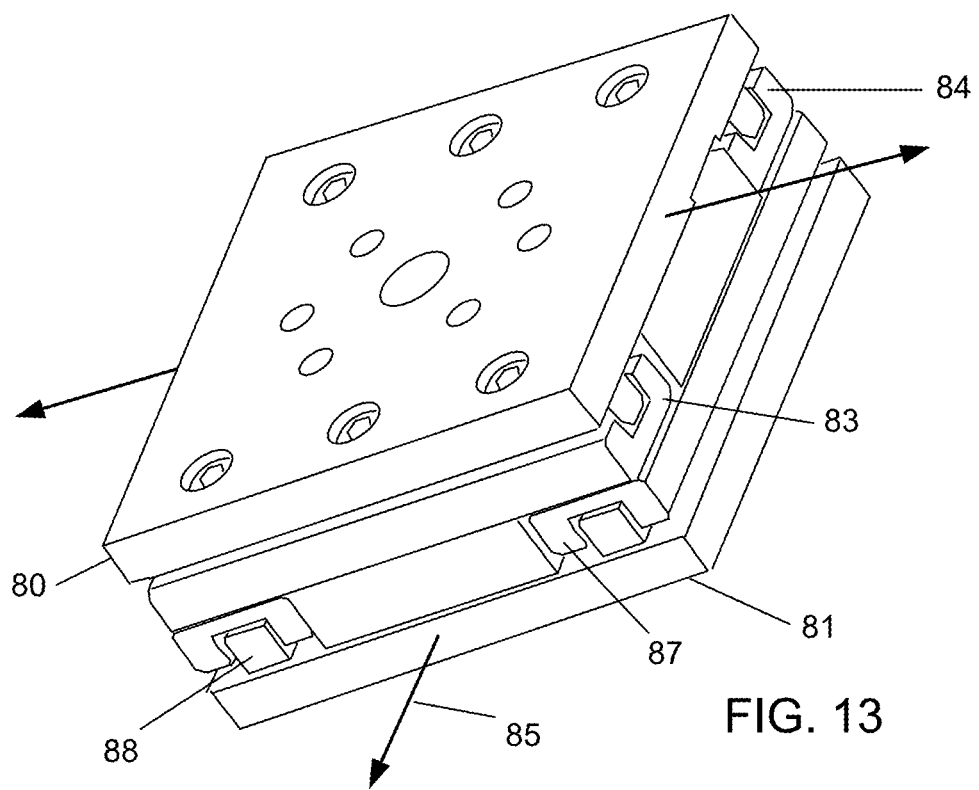
FIG. 13 shows another preferred embodiment of the present invention.

FIG. 13 shows a preferred embodiment of the present invention that provides for planar motion. Two piezo elements operate to move plate 80 in a linear fashion indicated by arrows 81 and 82. The linear motion of plate 80 is similar to the linear motion described above in reference to FIG. 6 and FIGS. 10A-10B. Plate 80 slides on tracks 83 and 84. Likewise, two other piezo elements operate to move plate 81 in a linear fashion indicated by arrow 85. The linear motion of plate 80 is also similar to the linear motion described above in reference to FIG. 6 and FIGS. 10A-10B. Plate 81 slides on tracks 87 and 88.

Multiple Piezo Elements

Figure 14:
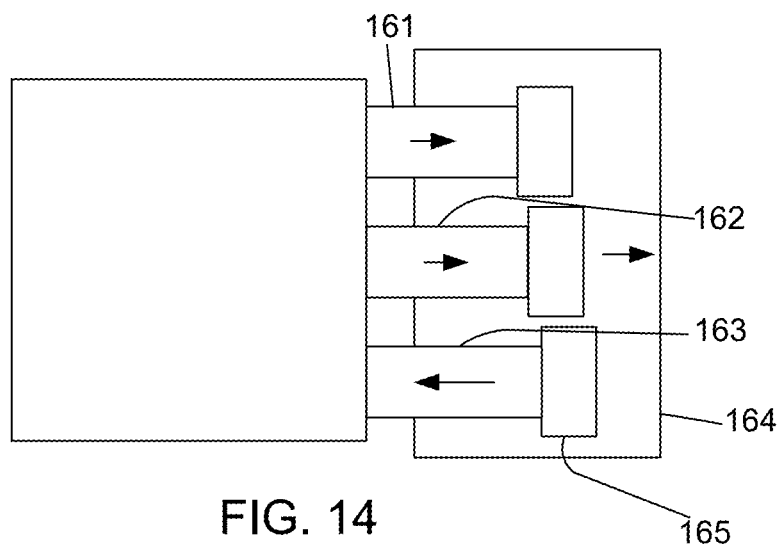
FIG. 14 shows another preferred embodiment of the present invention.
Figure 15:
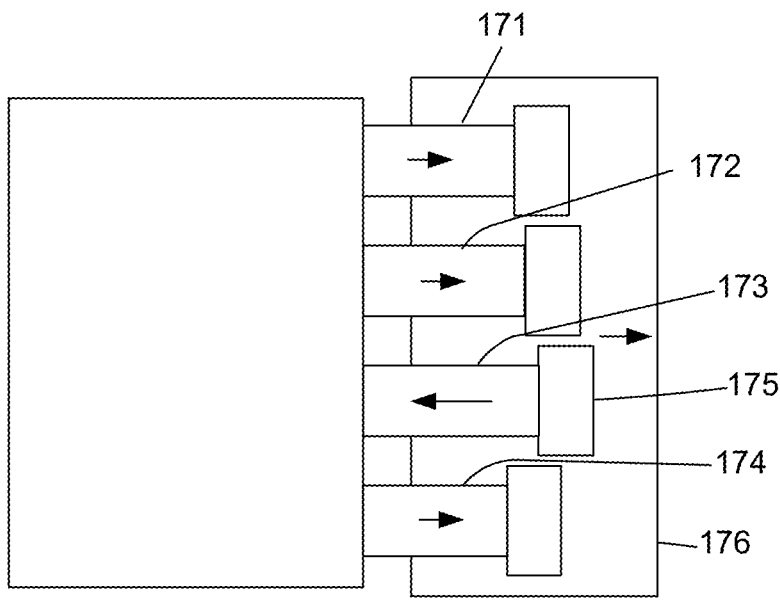
FIG. 15 shows another preferred embodiment of the present invention.

Although the above preferred embodiments disclosed stick-slip piezo motors that utilized two piezo elements, it is also possible to increase the number of piezo elements. For example, FIG. 14 shows a piezo motor that utilizes three piezo elements and FIG. 15 shows a piezo motor that utilizes four piezo elements. As the number of piezo elements increases, there are a greater number of piezo elements operating in the stick phase to counteract any reverse motion due to a piezo element operating in the slip phase.

For example, in FIG. 14 voltage has been applied to piezo elements 161 and 162 so that they are expanding relatively slowly to the right. Also, the voltage applied to piezo element 163 is rapidly reduced to zero causing it to contract to the left at a rapid rate. Piezo element 163 contracts at such a rapid rate that the friction force between friction element 165 and sliding friction element 164 is significantly overcome. Hence, piezo elements 161 and 162 are in the stick phase but piezo element 163 is now in the slip phase. The rightward motion of piezo elements 161 and 162 counteracts and overcomes most of the reverse motion imparted by piezo element 163. Hence, there is only a very slight dip to the resultant linear motion curve.

Also, in FIG. 15 voltage has been applied to piezo elements 171, 172, and 174 so that they are expanding relatively slowly to the right. Also, the voltage applied to piezo element 173 is rapidly reduced to zero causing it to contract to the left at a rapid rate. Piezo element 173 contracts at such a rapid rate that the friction force between friction element 175 and sliding friction element 176 is significantly overcome. Hence, piezo elements 171, 172, and 174 are in the stick phase but piezo element 173 is now in the slip phase. The rightward motion of piezo elements 171, 172, and 174 counteracts and overcomes most of the reverse motion imparted by piezo element 173. Hence, because there is a greater number of piezo elements moving rightward than shown in FIG. 14 there is an overall decrease to the effect of leftward motion imparted by piezo element 173.

Although the above-preferred embodiments have been described with specificity, persons skilled in this art will recognize that many changes to the specific embodiments disclosed above could be made without departing from the spirit of the invention. For example, it should be understood that the sliding friction elements and rotational friction elements described above are just some of the examples of moving friction elements. Other types of moving friction elements are also possible. Furthermore, it should be noted that the length of the sliding friction element can be varied as desired. There is no limit to the length of this element. For rotational motion, the radius of the rotational friction element may also be of any dimension required. Also, it should be noted that although the above descriptions referred to resultant motion in one direction (i.e., from left to right) it should be recognized that the opposite resultant motion (i.e., from right to left) can be easily achieved by merely reversing the applied voltage in order to reverse the motion of the piezo elements. Therefore, the attached claims and their legal equivalents should determine the scope of the invention.

What is claimed is:
1. A slip-stick piezo motor for minimizing or eliminating dragging during slip phases comprising:
   A. a piezo housing,
   B. a single sliding friction element,
   C. at least two piezo friction elements in friction communication with the single sliding friction element, said at least two piezo friction elements being adapted to move back and forth in a travel direction out of phase with at least one other piezo friction elements so as to drive said sliding friction element in a desired direction,
   D. at least two piezo elements, each of said at least two piezo elements being rigidly connected to said piezo housing and attached to one of the at least two piezo friction elements and adapted to move its attached piezo friction element back and forth in an alternating slip phase and stick phase out of phase with at least one other piezo friction element, and
   E. a plurality of alternating voltage sources, wherein each of said plurality of alternating voltage sources provides alternating voltage to one of said at least two piezo elements so that each one of said at least two piezo elements oscillates out of phase with respect to the other of said at least two piezo elements,
wherein said sliding friction element is precisely driven in said desired direction with minimal or no dragging during slip phases of any of the at least two piezo elements.

2. The stick-slip piezo motor as in claim 1, wherein said at least two piezo elements are two piezo elements.

3. The stick-slip piezo motor as in claim 2, wherein said two piezo elements are connected to the same side of said piezo housing, wherein both of said piezo elements are expanding together or contracting together when both are operating is said stick phase.

4. The stick-slip piezo motor as in claim 2, where said two piezo elements are connected to the opposite side of said piezo housing, wherein one of said piezo elements is expanding while the other of said piezo elements is contracting when both are operating is said stick phase.

5. The stick-slip piezo motor as in claim 1, wherein said travel direction is linear.

6. The stick-slip piezo motor as in claim 1, wherein said travel direction is rotational.

7. The stick-slip piezo motor as in claim 1, wherein said piezo motor allows for planar movement of said moving friction element.

8. The stick-slip piezo motor as in claim 1, wherein said at least two piezo elements are at least three piezo elements.

9. The stick-slip piezo motor as in claim 1, wherein said at least two piezo friction elements are ceramic friction elements.

10. The stick-slip piezo motor as in claim 1, wherein said moving friction element is a sliding friction element.

11. The stick-slip piezo motor as in claim 1, wherein said single sliding friction element is a rotational friction element.

12. The slip-stick motor as in claim 1 wherein the number of piezo elements and piezo friction elements is more than two all in friction communication with said single sliding friction element.

13. The slip-stick motor as in claim 1 wherein the timing of the slip phase for each piezo element is substantially shorter by at least a factor of six than the stick phase for each of the piezo elements.

* * * * *